Figure 1:
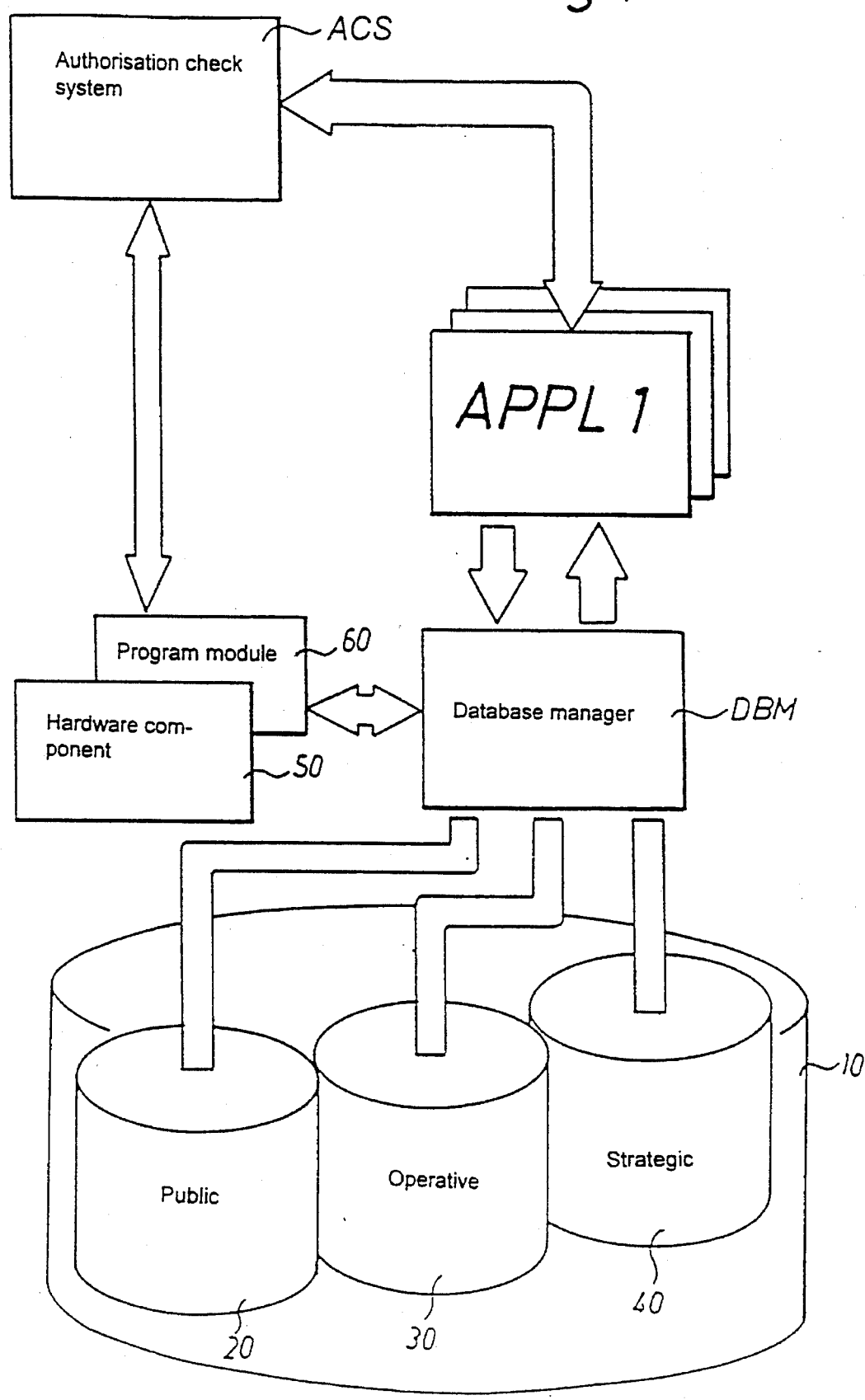

United States Patent [19]

Johansson

[11] Patent Number: 5,606,610
[45] Date of Patent: Feb. 25, 1997

[54] APPARATUS AND METHOD FOR STORING DATA

[75] Inventor: Jan Johansson, Torslanda, Sweden

[73] Assignee: Anonymity Protection In Sweden AB, Sweden

[21] Appl. No.: 464,891

[22] PCT Filed: Sep. 23, 1994

[86] PCT No.: PCT/SE94/00882

§ 371 Date: Jun. 28, 1995

§ 102(e) Date: Jun. 28, 1995

[87] PCT Pub. No.: WO95/15628

PCT Pub. Date: Jun. 8, 1995

[30] Foreign Application Priority Data

Nov. 30, 1994 [SE] Sweden ................... 9303984

[51] Int. Cl.$^6$ ................................ H04L 9/00
[52] U.S. Cl. ........................... 380/4; 380/45
[58] Field of Search ..................... 380/4, 33, 45

[56] References Cited

U.S. PATENT DOCUMENTS 5,343,527 8/1994 Moore ............................ 380/4
5,392,357 2/1995 Bulfer et al. ....................... 380/3

FOREIGN PATENT DOCUMENTS

93/11619 6/1993 WIPO.

Primary Examiner—Salvatore Cangialosi

[57] ABSTRACT

A method and apparatus for storing data comprising an original identity(OID) and associated descriptive information(DI) are disclosed. By means of a first algorithm(ALG1), the original identity(OID) is encrypted to an update identity(UID) which, by means of a reversible algorithm(ALG2), is encrypted to a storage identity(SID) which is stored as a record(P) on a storage medium along with associated descriptive information(DI). At the times when storage identities(SID) of selected records(P) are to be replaced with new storage identities(SID'), the storage identities(SID) are decrypted in order to recreate the corresponding update identities(UID), which then are encrypted, by means of a new altered reversible algorithm(ALG2'), to new storage identities(SID') intended to replace the previous storage identities (SID).

21 Claims, 3 Drawing Sheets

APPARATUS AND METHOD FOR STORING DATA

This invention relates to an apparatus and a method for storing data, more specifically data comprising identifying information, such as personal code numbers, as well as associated descriptive information.

In computer-aided information management, it is imperative that the individual's personal integrity be protected against violation when setting up and keeping personal registers, i.e. registers containing information on individuals. Also in industry, banking and defence, as well as many other sectors where computer-aided information management is used, it is essential that stored data be protected against unauthorised access. In particular, there are regulations restricting or prohibiting the linking and matching of personal registers, since this often results in one or more new personal registers containing sensitive information that can be directly linked to individuals.

There is, however, a great need of being able to link and match different personal registers without posing a threat to the personal integrity of the individual.

Within this technical field, there are different cryptographic storage methods in which, for security reasons, the information to be stored is first encrypted and then stored on a storage medium. However, these prior-art encrypting methods are often sensitive to tracking, since every registration in or update of a database involves an alteration which, by means of tracking tools, can be linked to the corresponding non-encrypted original information bearing a one-to-one relation to the encrypted information. After a number of trackings, all the encrypted information can be converted to plain text.

This invention aims at solving the above problem of the prior art and to this end provides an apparatus as set forth in appended claim 1, as well as a method as set forth in appended claim 7.

According to the invention, the information to be stored comprises an original identity OID and associated descriptive information DI. Examples of the original identity are personal code number, drawing number, document identity, and registration number for vehicles. The associated descriptive information is such information as does not reveal the original identity, i.e. that cannot be linked directly thereto. A distinctive feature of the invention is that the original identity OID is completely separated from the descriptive information DI, which is achieved by initially having the original identity OID undergo a first encryption by means of a first algorithm ALG1, resulting in an update identity UID. Then, the update identity UID undergoes a second encryption by means of a reversible algorithm ALG2, resulting in a storage identity SID. The thus-created storage identity SID is, along with associated descriptive information DI, stored as a record on a storage medium. Thus, the original identity is completely separated from the associated descriptive information. If the original identity consists of a personal code number or the like, the resulting records may be regarded as pure information records in contrast to personal records.

In order to prevent the descriptive information DI from ever being relinked to the original identity OID, the first algorithm ALG1 preferably is a non-reversible algorithm, i.e. an algorithm giving each original identity a unique update identity and providing a great number of identities when decrypting efforts are made.

Furthermore, the invention is distinguished by the fact that the original identity OID is encrypted in two separate steps when generating the storage identity SID, and that the second encrypting step is performed by means of a reversible algorithm ALG2. These distinctive features of the invention enable the creation of "floating" storage identities of the records in order to prevent all unauthorised tracking. According to the invention, the storage identities SID of selected records, preferably all the records, stored on the storage medium are, at certain times, replaced with new storage identities SID'. As a result, the information obtained by tracking, if any, is perfectly useless as soon as the storage identities according to the invention have been replaced with new ones. The storage identities SID of the stored records are, according to the invention, altered by first decrypting the storage identities SID of the selected records by means of a third algorithm ALG3, recreating the corresponding update identities UID. It will be appreciated that the third algorithm ALG3 for decryption is directly related to the reversible algorithm ALG2 which, at a previous time, was used for creating the storage identities SID from the update identities UID. Then, the reversible algorithm ALG2 is altered to a new reversible algorithm ALG2', whereupon the recreated update identities UID are encrypted to new storage identities SID' by means of the altered, new reversible algorithm ALG2'.

The times when the storage identities are replaced with new ones may be controlled completely at random, occur at set intervals, depend on the number of updates, and so forth.

In a preferred embodiment of the invention, the selected records are, when given new storage identities, also moved to new physical locations on the storage medium. In combination with "floating" storage identities, this effectively prevents all attempts at unauthorised tracking.

The invention enables efficient retrieval of stored data for operative as well as strategic purposes, as well as so-called longitudinal update of strategic data.

When retrieving data for operative purposes, the descriptive information stored for a given original identity is retrieved for reading, update, alteration, printout, and so forth. According to the invention, this is possible by first encrypting such a given original identity to a storage identity in two steps by means of the above two algorithms. All stored records containing the thus-obtained storage identity can be expediently located and the corresponding descriptive information be retrieved. In particular, such retrieval of operative data associated with a given original identity does not require any decryption of the corresponding storage identity, nor any storage of the given original identity, which prevents all unwanted linking between the original identity and the associated descriptive information.

In order to retrieve data for strategic purposes, the storage identity can be put to effective use when putting together data that have the same storage identity. Retrieving data for strategic purposes differs from retrieving data for operative purposes in that one does not wish or need to know to which original identity a certain item of descriptive information belongs, but one nevertheless has to be absolutely certain that all the descriptive information retrieved belongs to the same original identity. Obviously, this is of great importance when, and this is a case of particular interest, the original identity corresponds to a specific individual, since the invention makes it possible to put together, for strategic purposes, descriptive information relating to different individuals, without any risk of their identities being revealed. It is to be understood that the invention enables so-called longitudinal update of strategic information, which among other things means that a given individual is observed for some time and that, at different times, new descriptive information is stored in such a manner that it can be linked to information previously stored for the same individual, without there being any risk of revealing the identity of the individual.

It should be emphasised that the storage of new descriptive information associated with a certain original identity does not necessarily require the creation of a new record containing the storage identity and the descriptive information. The new descriptive information may instead be stored in an existing record whose storage identity corresponds to the original identity at issue.

Figure 2:
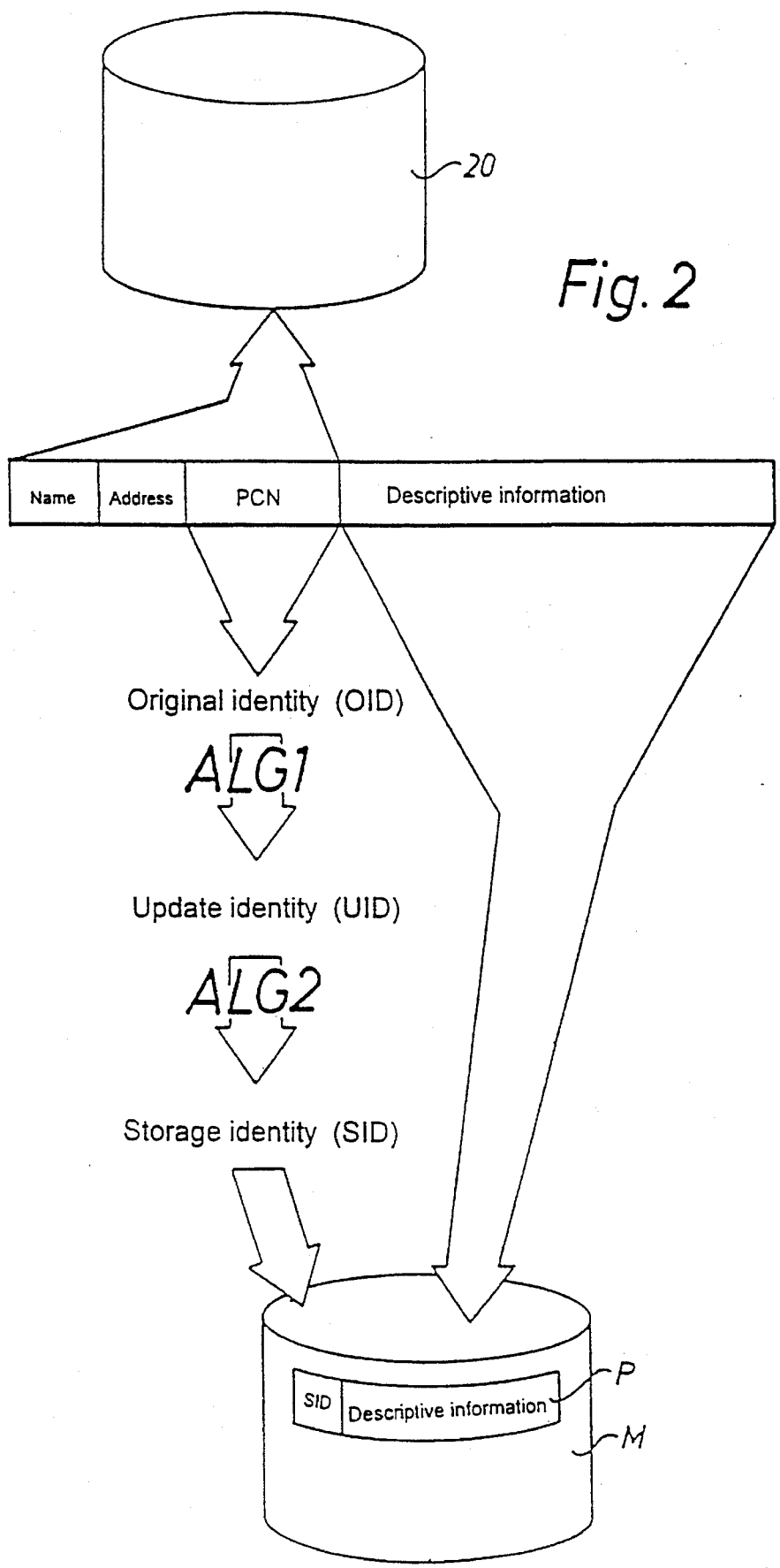
Figure 3:
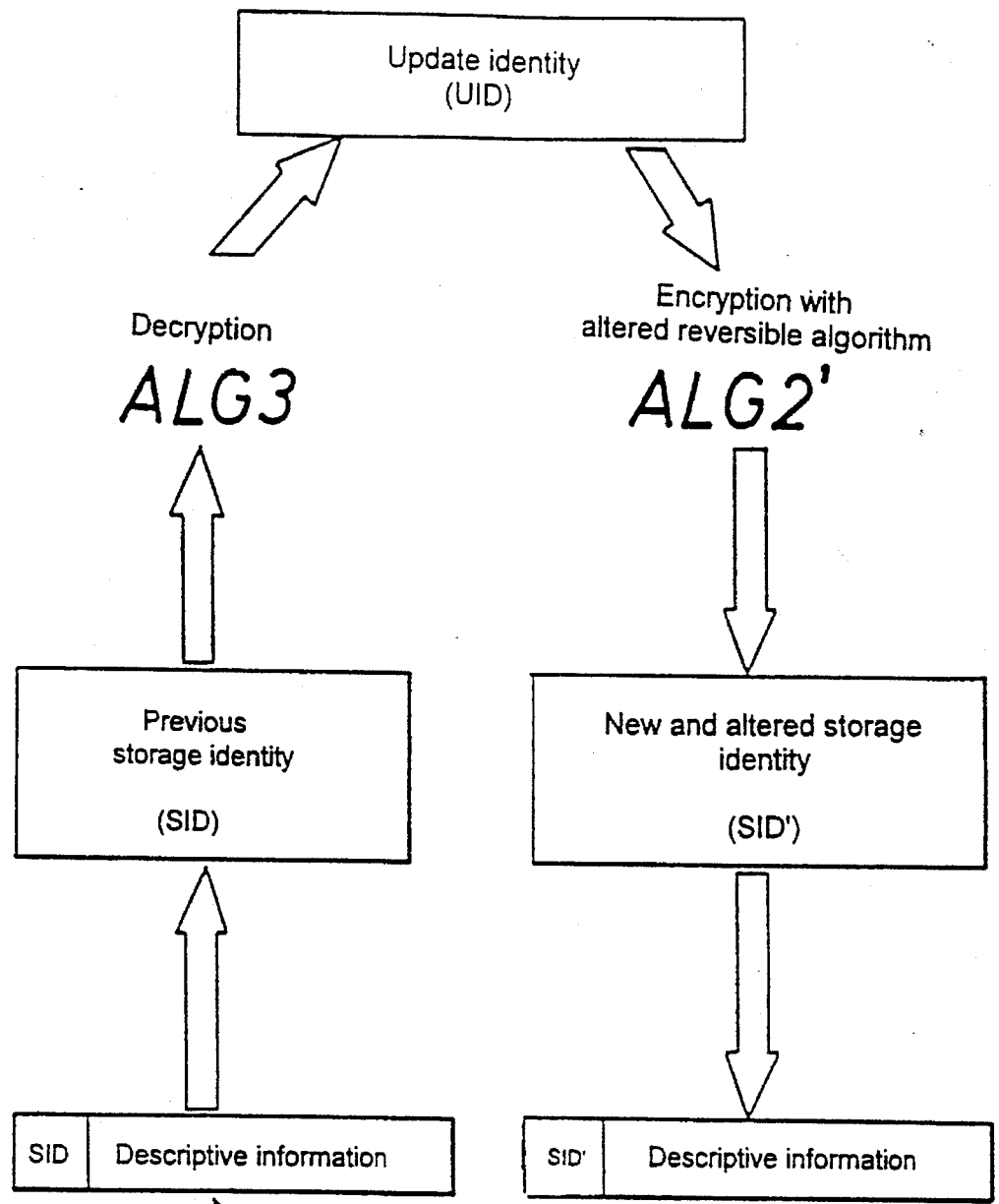

These and other distinctive features, properties and advantages of the invention are stated in the appended claims and also appear from the following description of one mode of implementation of the invention. In the drawings, FIG. 1 is a block diagram illustrating how the invention can be implemented in a computer system, FIG. 2 illustrates different encrypting steps used when storing information in accordance with the invention, and FIG. 3 illustrates encrypting and decrypting steps used when altering the storage identities in accordance with the invention.

Reference is now made to FIG. 1, which illustrates a computer system comprising an authorisation check system ACS, which may be of any known type; a number of user tools or applications, of which one is designated APPL 1; a database manager DBM; a database 10, which here includes a public register 20 for storing public information, an operative register 30 for storing operative data, and a strategic register 40 for storing strategic data; a hardware component 50; and a program module 60. The invention is chiefly implemented in the hardware component 50 and the program module 60.

The hardware component 50 has an encapsulation that renders it tamper-proof in order to prevent monitoring by tracking tools or compilation. The hardware component 50 acts as a distributed processor, which in particular has the functions of creating reversible and non-reversible encrypting algorithms, supplying randomly-produced variables for encrypting and decrypting algorithms, initiating, e.g. at times chosen at random, an alteration of the storage identities of stored records, storing the encrypting and decrypting algorithms last used, storing information on user authorisations, if several users are to be authorised to have access to an operative record, and linking an original identity (e.g. a personal code number) to the right record in a database.

Thus, the hardware component 50 may comprise a microprocessor, a microcode-programmed PROM storage, required I/O units, encrypting and decrypting units, and storage units for storing information on the algorithms employed as well as the user authorisations. The construction of the hardware component 50 may vary with different applications and is easily implemented by those skilled in the art with the aid of the present description, for which reason the construction of this component will not be described in more detail here.

The program module 60 primarily serves to handle the dialogue between the hardware component 50 and the user application at issue. The program module 60 also handles the dialogue between the hardware component 50 and the authorisation check system ACS, and the sorting out or removal of stored data, events log, and so forth. The program module 60 may also transfer records from operative registers to strategic registers when records are being sorted out from the former.

In the following description of the system of FIG. 1, the designations given below will be used for describing the encrypting and decrypting algorithms employed. Generally speaking, the encrypting and decrypting algorithms can be described as follows:

$$F_{Type}(\text{Random number, Input data}) = \text{Results}$$

wherein

F designates a function,

Type indicates the type of function. (In this embodiment, the following types are used:

$F_{KIR}$=Non-reversible encrypting algorithm $F_{KR}$=Reversible encrypting algorithm $F_{DKR}$=Decrypting algorithm), Random number represents one or more constants and/or variables included in the function F, Input data are the data to be encrypted or decrypted, and Results indicate a unique function value for a given function.

The process for storing information in the database will now be described with reference to FIGS. 1 and 2 in conjunction. It is a condition that the information to be stored can be divided into identifying information and associated descriptive information. The following information on a specific individual is given as an example.

| INFORMATION TO BE STORED | | | |
|---|---|---|---|
| IDENTIFYING INFORMATION | | | DESCRIPTIVE INFORMATION |
| PERSONAL CODE NUMBER (PCN) | NAME | ADDRESS | DI |

In the first step of the process, the information is divided into identifying information and descriptive information.

In a second step (illustrated in FIG. 2), the identifying information (PCN, NAME, ADDRESS) is stored in the public register 20, optionally in the form of plain text, since this information is of the type that is generally accessible.

In a third step, an original identity OID is selected from the identifying information. In this example, OID=personal code number PCN. The original identity OID is encrypted by means of a non-reversible algorithm ALG1, which is produced at random by the hardware component 50. This non-reversible encryption results in an update identity UID as follows:

$$\text{ALG1: } F_{KIR}(\text{Random number, OID}) = \text{UID}$$

The encrypting algorithm ALG1 is such that attempts at decryption of the update identity UID to the original identity OID results in a great number of identities, which makes it impossible to link a specific UID to the corresponding OID.

In a fourth step, the update identity UID is encrypted by means of a reversible algorithm ALG2, which also is produced at random by the hardware component 50. This reversible encryption results in a storage identity SID as follows:

$$\text{ALG2: } F_{KR}(\text{Random number, UID}) = \text{SID}$$

The encrypting algorithm ALG2 is such that there exists a corresponding decrypting algorithm ALG3 by means of which the storage identity SID can be decrypted in order to recreate the update identity UID.

In a fifth step, the obtained storage identity SID is stored along with the descriptive information DI as an information record P on the storage medium, which is designated M in FIG. 2. In this example, the record P is stored in the operative database 30 as well as in the strategic database 40.

Preferably, all alterations in the databases are performed in randomly time-controlled batches, such that every alteration in one register normally involves simultaneous alteration or addition of a plurality of records, which is intended to prevent tracking. To this end, data can be stored temporarily in a buffer store, optionally in encrypted form.

As appears from the foregoing, a stored information record P has the following general appearance:

| Storage identity (SID) | Descriptive information (DI) |
|---|---|

Since the original identity OID is encrypted in two steps, of which the first is non-reversible and the second is reversible, it is possible to store the descriptive information DI along with a storage identity SID that never can be linked to the original identity OID, as well as to create "floating" (i.e. which change over time) storage identities SID while retaining the possibility of locating, for a specific original identity OID, the associated descriptive information DI stored.

The process for creating "floating" storage identities will now be described in more detail with reference to FIG. 3.

As mentioned above, the storage identities SID are changed over time in order to prevent, or at least make much more difficult, all attempts at tracking, i.e. unauthorised attempts at locating, when a register is updated, where and in which form given original information is stored on the storage medium.

The times when the storage identities SID are to be replaced with new storage identities SID' can be controlled at random by the hardware component 50. Alternatively, these times can be controlled by other factors, such as the number of alterations in or updates of the database.

At every time, one decrypts the storage identities SID of all the records P whose storage identities are to "float" or be altered. The hardware component 50 has an internal storage, in which is stored information on the reversible algorithm ALG2 last used, which makes it possible, at each time, to produce in the hardware component 50 a corresponding decrypting algorithm ALG3, by means of which the storage identities SID can be decrypted in order to recreate the corresponding update identities UID.

ALG3: $F_{DKR}$(Random number, SID)=UID

Thus, the following relationship applies:

$F_{DKR}$(Random number, $F_{KR}$(Random number, UID))=UID

Thereafter, the hardware component 50 produces, by means of new random numbers (Random numbers') a new and altered reversible algorithm ALG2', by means of which the recreated update identities UID are reversibly encrypted to new and altered storage identifies SID' to be stored along with the associated descriptive information in the selected records.

ALG2': $F_{KR}$(Random number', UID)=SID'

As described in the foregoing in connection with general storage of information, the alteration of the storage identities on the storage medium preferably takes place in a batch.

When the storage identities SID of the records P are thus to be replaced with the new storage identities (SID'), one may, as a further matter of precaution, move the records P to new physical locations on the storage medium.

In a preferred embodiment of the invention, such an alteration of the storage identities is produced every time the content of the databases is to be altered or updated.

Operative data is retrieved from the operative register 30 in FIG. 1 in the following manner. To begin with, the user inputs the current original identity OID, i.e. PCN, to the program application APPL 1 along with a statement concerning the requested information. APPL 1 stores the PCN and the statement on the requested information, i.e. the statement on the register or database where the information is to be searched for, and then transmits the PCN and the database statement to the database manager DBM which is to retrieve the requested information. The database manager notes that the records of the current database are protected by the inventive system, and therefore transmits the PCN along with the database name to the program module 60 and the hardware component 50. The database name indicated is used for producing, from tabular information stored in the hardware component 50, correct algorithms ALG1 and ALG2 by means of which the PCN is converted via the update identity UID to the storage identity SID. The thus-produced storage identity SID is transmitted to the database manager DBM, which then searches in the database at issue (here the operative register 30) for descriptive information DI whose storage identities correspond to the storage identity SID produced. The database manager DBM returns the descriptive information DI to the application APPL 1, which links the thus-produced descriptive information DI to the personal code number PCN. It should here be emphasised that the personal code number is stored in APPL 1 only, i.e. in the working storage of the computer, and the identity of the individual thus remains perfectly safe.

Data are retrieved from the strategic database 40 without resorting to the use of any original identity OID. The search is based directly on the descriptive information, and since descriptive information associated with one and the same individual is stored along with the same storage identity SID, all descriptive information associated with a single individual is easily put together without in any way threatening the anonymity of the individual.

Different encrypting algorithms can be used in the operative register 30 and the strategic register 40. However, the non-reversible algorithm ALG1 may be the same. Furthermore, it will be appreciated that the tabular algorithm information stored in the hardware component 50 may comprise many more registers than are shown in FIG. 1.

The inventive embodiment described above can be modified in many ways within the scope of the invention as defined in the appended claims. The term "encryption" is meant to encompass the term "hashing" throughout.

In one modification of the inventive method that is of particular interest, each information record P in the operative database 30 is supplemented with a user identity UI as follows.

| Storage identity (SID) | User identity (UI) | Descriptive information (DI) |
|---|---|---|

Thus, it becomes possible to link records to individual users in the operative database. When a user attempts at retrieving the information in a record, it is checked whether he is authorised to have access to the record in question. In particular, it becomes possible for different users to store descriptive information about one and the same individual without enabling unauthorised users to gain access to the information stored. The user identity UI in stored records can be changed without affecting the storage identity SID or the descriptive information DI. If a user is to have access to records containing other user identities UI than his own, the hardware component 50 can be supplemented with a table containing stored information that controls such authorisation.

Another conceivable modification of the embodiment described provides the possibility of using a reversible algorithm in the first encrypting step ALG1, which does not, however, involve the same degree of security as the use of a non-reversible algorithm.

Finally, it should be mentioned that, if need be, also the descriptive information can be encrypted before storage by means of a reversible algorithm in order to enhance security even further.

I claim:

1. An apparatus for storing data comprising an original identity (OID) and associated descriptive information (DI), characterised by a first encrypting means (50) which is arranged, by means of a first algorithm (ALG1), to encrypt the original identity (OID) to an update identity (UID), a second encrypting means (50) which is arranged, by means of a reversible algorithm (ALG2), to encrypt the update identity (UID) to a storage identity (SID), which is to be stored along with associated descriptive information (DI) as a record (P) on a storage medium (30, 40), and a decrypting means (50) which is arranged, at times when the storage identities (SID) of selected stored records (P) are to be replaced with new storage identities (SID'), to decrypt these storage identities (SID) in order to recreate the corresponding update identities (UID), the second encrypting means (50) being arranged, at said times and by means of an altered reversible algorithm (ALG2'), to encrypt the recreated update identities (UID) to new storage identities (SID'), which are to replace the previous storage identities (SID).

2. An apparatus as set forth in claim 1, characterised by a means arranged to randomly establish said times when the storage identities (SID) of the selected records (P) are to be replaced with new storage identities (SID').

3. An apparatus as set forth in claim 1, characterised by the first algorithm (ALG1) for creating the update identity (UID) being a non-reversible algorithm.

4. An apparatus as set forth in claim 1, characterised by the first and the second encrypting means and the decrypting means being implemented as a hardware component (50).

5. An apparatus as set forth in claim 4, characterised by the hardware component (50) comprising a processor of its own, which is adapted to act as a distributed processor in a computer.

6. An apparatus as set forth in claim 4, characterised by the hardware component (50) being adapted to create variable algorithms and comprising a means for storing the algorithms last created.

7. An apparatus as set forth in claim 2, characterized by the first algorithm (ALG1) for creating the update identify (UID) being a non-reversible algorithm.

8. An apparatus as set forth in claim 2, characterised by the first and second encrypting means and the decrypting means being implemented as a hardware component (50).

9. An apparatus as set forth in claim 3, characterized by the first and second encrypting means and the decrypting means being implemented as a hardware component (50).

10. An apparatus as set forth in claim 5, characterized by the hardware component (50) being adapted to create variable algorithms and comprising a means for storing the algorithms last created.

11. A method for storing data comprising an original identity (OID) and associated descriptive information (DI), characterised by the steps of encrypting the original identity (OID) to an update identity (UID) by means of a first algorithm (ALG1), encrypting the update identity (UID) to a storage identity (SID) by means of a reversible algorithm (ALG2), storing the storage identity (SID) and the descriptive information (DI) as a record (P) on a storage medium (30, 40), and performing the following substeps at times when the storage identities (SID) of selected stored records (P) are to be replaced with new storage identities (SID'):

decrypting the storage identities (SID) of the selected records (P) in order to recreate the corresponding update identities (UID), altering the reversible algorithm (ALG2) and encrypting, by means of the altered reversible algorithm (ALG2'), the recreated update identities (UID) to new storage identities (SID'), and replacing the storage identities (SID) of the selected records (P) with the new storage identities (SID').

12. A method as set forth in claim 11, characterised by the step of selecting, as said selected records (P), all the records (P) stored on the storage medium (30, 40).

13. A method as set forth in claim 11, characterised in that the step of replacing the storage identities (SID) of the selected records (P) with the new storage identities (SID') is carried out in a batch, so that the storage identities (SID) of the selected records (P) are altered essentially simultaneously on the storage medium (30, 40).

14. A method as set forth in claim 11, characterised in that the step of replacing the storage identities (SID) of the selected records (P) with new storage identities (SID') also comprises moving the selected records (P) to new physical locations on the storage medium (30, 40).

15. A method as set forth in claim 11, characterised by the step of encrypting also the descriptive information (DI) before this is stored on the storage medium in the respective records (P).

16. A method as set forth in claim 8, characterized in that the step of replacing the storage identities (SID) of the selected records (P) with the new storage identities (SID') is carried out in a batch, so that the storage identities (SID) of the selected records (P) are altered essentially simultaneously on the storage medium (30, 40).

17. A method as set forth in claim 8, characterized in that the step of replacing the storage identities (SID) of the selected records (P) with new storage identities (SID') also comprises moving the selected records (P) to new physical locations on the storage medium (30, 40).

18. A method as set forth in claim 9, characterized in that the step of replacing the storage identities (SID) of the selected records (P) with new storage identities (SID') also comprises moving the selected records ()P) to new physical locations on the storage medium (30, 40).

19. A method as set forth in claim 8, characterized by the step of encrypting also the descriptive information before this is stored on the storage medium in the respective records (P).

20. A method as set forth in claim 9, characterized by the step of encrypting also the descriptive information (DI) before this is stored on the storage medium in the respective records (P).

21. A method as set forth in claim 10, characterized by the step of encrypting also the descriptive information (DI) before this is stored on the storage medium in the respective records (P).

* * * * *

UNITED STATES PATENT AND TRADEMARK OFFICE
CERTIFICATE OF CORRECTION

PATENT NO.  : 5,606,610
DATED       : February 25, 1997
INVENTOR(S) : Jan JOHANSSON It is certified that error appears in the above-indentified patent and that said Letters Patent is hereby corrected as shown below:

Title page, item [30] change "Nov. 30, 1994" to --Nov. 30, 1993--.

Signed and Sealed this

Twenty-third Day of December, 1997

Attest:

BRUCE LEHMAN

*Attesting Officer*    *Commissioner of Patents and Trademarks*